(12) United States Patent
Luckey (10) Patent No.: US 11,092,417 B1
(45) Date of Patent: Aug. 17, 2021

(54) INTELLIGENT MEASURING TAPE DEVICE AND METHOD FOR DIGITAL MEASUREMENTS

(71) Applicant: Dylan E. Luckey, Montague, CA (US)

(72) Inventor: Dylan E. Luckey, Montague, CA (US)

( * ) Notice: Subject to any disclaimer, the term of this patent is extended or adjusted under 35 U.S.C. 154(b) by 224 days.

(21) Appl. No.: 16/505,388

(22) Filed: Jul. 8, 2019

Related U.S. Application Data (60) Provisional application No. 62/828,742, filed on Apr. 3, 2019.

(51) Int. Cl.
*G01B 3/10* (2020.01)
*G01B 3/1003* (2020.01)
*G01B 3/1056* (2020.01)
*G01B 3/1061* (2020.01)

(52) U.S. Cl.
CPC ......... *G01B 3/1003* (2020.01); *G01B 3/1056* (2013.01); *G01B 3/1061* (2013.01)

(58) Field of Classification Search
CPC ............................ G01B 3/1061; G01B 3/1069
USPC ........................................ 33/759, 760, 761
See application file for complete search history.

(56) References Cited

U.S. PATENT DOCUMENTS

| | | | |
|---|---|---|---|
| 4,366,623 A | 1/1983 | Bergqvist | |
| 4,510,444 A | 4/1985 | Haussel et al. | |
| 5,426,863 A * | 6/1995 | Biggel | G01B 3/1061 33/763 |
| 5,433,014 A | 7/1995 | Falk et al. | |
| 5,983,514 A * | 11/1999 | Lindsey | G01B 3/1061 33/760 |
| 7,363,723 B1 | 4/2008 | Peterson | |
| 7,401,416 B2 * | 7/2008 | Brooks | G01B 3/1084 33/760 |
| D616,775 S * | 6/2010 | Berens | G01B 3/1061 D10/72 |
| 8,356,419 B2 | 1/2013 | Lord | |
| 8,732,974 B2 * | 5/2014 | Jayanetti | G01B 3/1061 33/760 |
| 2006/0089817 A1 * | 4/2006 | Spanski | G01S 7/521 702/94 |
| 2007/0101600 A1 * | 5/2007 | Alders | G01B 3/1084 33/760 |

(Continued)

*Primary Examiner* — George B Bennett
(74) *Attorney, Agent, or Firm* — Jerry Haynes Law (57) ABSTRACT

A digital workpiece measurement system and method for intelligent measurements measures the length, angles, and characteristics of a workpiece, and then automatically displays the measurement and the other identifying measurement related data in a digital, incrementally adjustable manner. The workpiece measurement system provides a flexible measuring tape and micrometer head that electronically measures the distance between a starting measuring point and an ending measuring point. The short point, long point, square cut angle, and characteristics of the workpiece are inputted into the system. Various functions controlled by short, long, and square check switch mechanisms allow for manually inputting the measurements, incrementally editing the measurements, identifying the short point, long point, and square edges of the workpiece, and transmit the measurements and other data to a remote data storage unit for future processing and measurement analysis. The system also detachably attaches to a belt or wall through a clip or adhesive.

20 Claims, 6 Drawing Sheets

(56) References Cited

U.S. PATENT DOCUMENTS

| 2008/0072446 A1 | 3/2008 | Hu |
| 2008/0086903 A1* | 4/2008 | Peterson ............... G01B 3/1084 33/760 |
| 2011/0023312 A1 | 2/2011 | Turner |

* cited by examiner

INTELLIGENT MEASURING TAPE DEVICE AND METHOD FOR DIGITAL MEASUREMENTS

CROSS-REFERENCE TO RELATED APPLICATIONS

This application claims the benefit of U.S. provisional application No. 62/828,742, filed Apr. 3, 2019 and entitled INTELLIGENT MEASURING TAPE SYSTEM AND METHOD OF DIGITAL MEASUREMENTS, which provisional application is incorporated by reference herein in its entirety.

FIELD OF THE INVENTION

The present invention relates generally to a digital workpiece measurement system and method for intelligent measurements. More so, the present invention relates to a measuring tape system that provides a flexible tape with linear measurement marks that measures distance as a function of length of the tape extended from a housing, and then the distance from a starting measuring point to an end measuring point of a workpiece, and provides functions for: viewing on a display screen, digital storage of the measurement, transmission to a remote display, computer or corresponding intelligent measuring tape, short point and long point switch mechanisms to help in determining what end of an angle to start the measurement, and a square check switch mechanism that helps in determining the square point of measurement where two edges of the workpiece are 90° to each other, and also identifies the material being measured; and whereby the measuring tape system is configured to adhere to a surface or clip to a belt for facilitated measurement positioning and carrying.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a measuring tape is used to measure length and distance measurement. In contrast the length of distance in a quick and efficient manner. When no dimensions are provided. Generally, measuring tape is a roll-up, self-retracting style tape measure that's designed for carpentry or tailoring. The actual tape portion of the measure, called the ribbon, is usually constructed from a stiff metallic material that can stiffen when needed but can also roll up for simple use and storage. The ribbon is extendable and retractable from the opening in a housing to measure distance as a function of length of the measuring ribbon extended from the housing.

Often, when the measuring tape is used to take measurements, it is necessary to mark down the measurement for reference and future use before forgetting the measurement. Therefore, while working at a job site the measurer needs to have writing implements such as paper, pencil and pencil sharpener. Because these tools are odd pieces not integrated with tape measures, it is most often the case that these writing tools are misplaced or forgotten.

Additionally, when measuring a workpiece, if the surface or material to be measured does not have a right angle for the end hook to securely attach to, it is difficult to achieve an accurate measurement. This is a common problem which can arise in building structures that have compound angles.

Further, any piece of mitered trim has two points on its end. The acute angle at the very tip of the workpiece is called the long point; the short point is the obtuse angle on the inside edge of the trim piece. Measuring from the short point is a recurring problem. Unfortunately, there is no place to hook your tape. Thus, it sometimes is easier to measure from the short point. This can only be achieved by either trying to hold the end hook in a manner that is clumsy or inaccurate, or securing the terminus on a mounting surface or someone holding the terminus.

SUMMARY

Illustrative embodiments of the disclosure are generally directed to a digital workpiece measurement system and method for intelligent measurements. The digital workpiece measurement system measures the length, angles, and characteristics of a workpiece, and then displays the measurement and the other identifying measurement related data in a digital, incrementally adjustable manner.

In one embodiment, the system provides a unique housing that protects the electrical and mechanical components inside, and also is configured to adhere to a surface, or clip to a belt, for facilitated measurement positioning and carrying. A flexible measuring tape having multiple, spaced-apart linear measurement extends and retracts from the housing. The linear marks identify the distance between a starting measuring point and an end measuring point along a section of the workpiece.

In another embodiment, the measured distance is inputted into a digital display screen for viewing inputted measurements and other measurement related data. The displayed measurement can be stored on a data storage unit in a processor or stored remotely in a data storage unit. The measurement can also be transmitted to a second digital workpiece measurement system, a laptop, a computer, or server for viewing by another measurer.

The system also provides at least one incremental switch mechanism that is operable to incrementally increase and decrease the measurement. The incremental switch mechanism can be depressed to incrementally increase and decrease and the inputted alphanumeric character representing the measurement.

The system also provides numerous intelligent functions that help in determining the starting and end measuring points for a short cut angle, a long cut angle, and a square cut angle on the workpiece for more precise, manageable measurements. Unique function switch mechanisms solve problems associated with measuring mitered trims and square angles common in a carpentry workpiece.

In one embodiment, a short point switch mechanism and a long point switch mechanism record the type of angle for the starting measuring point and the end measuring point, so as to help in determining what end of an angle to start the measurement. The short cut switch mechanism indicates measuring to or from an acute angle; while a long cut switch mechanism indicates measuring to or from an obtuse angle.

A square check switch mechanism is used in coordination with alignment of the measuring tape to ensure two edges of the workpiece are 90° to each other (square). The square check switch mechanism indicates measuring to or from a square angle in which two edges are at a perpendicular to each other. This angle determination functions are recorded with the length measurement to help in determining the optimal point to start and end the measurement across the workpiece.

One objective of the present invention is to measure the length of a workpiece and displays the measurement and other identifying measurement related data in a digital, incrementally adjustable manner.

Another objective is to provide an improved flexible measuring tape for an intelligent digital tape measure.

Another objective is to digitally measure the length for instant viewing on a display screen, storage on a process or and remote data storage unit, and transmission to the remote data storage unit.

Another objective is to eliminate the need to carry paper and pencil at a worksite when measuring a workpiece.

Another objective is to make measurements longer than the total length of the measuring tape electronically adding multiples of the total length of the tape to the actual tape reading to obtain the final length dimension.

Another objective is to minimize confusion on where to start or end the measurement at various obtuse, acute, and square angles by recording the starting measuring point as either a short point or a long point.

Yet another objective is to view the measurements of the system remotely.

Yet another objective is to manipulate, edit, and delete the measurements on a digital screen.

Yet another objective is to provide a digital system that helps determine the short point on a mitered trim of the workpiece.

Yet another objective is to provide a digital system that helps determine a square of two edges of the workpiece.

Yet another objective is to determine the material of the workpiece through a square check switch mechanism function.

Yet another objective is to provide an easy to use measurement system for measuring the length of the workpiece.

Yet another objective is to provide an inexpensive to manufacture digital workpiece measurement system.

Other systems, systems, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific systems and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A digital workpiece measurement system 100 and method 1000 for intelligent measurements is referenced in FIGS. 1-10. The digital workpiece measurement system, hereafter "system 100" is configured to measure the length, angles, and characteristics of a workpiece 116, and then automatically display the measurement and the other identifying measurement related data in a digital, incrementally adjustable, storable, and transmittable manner.

Figure 1:
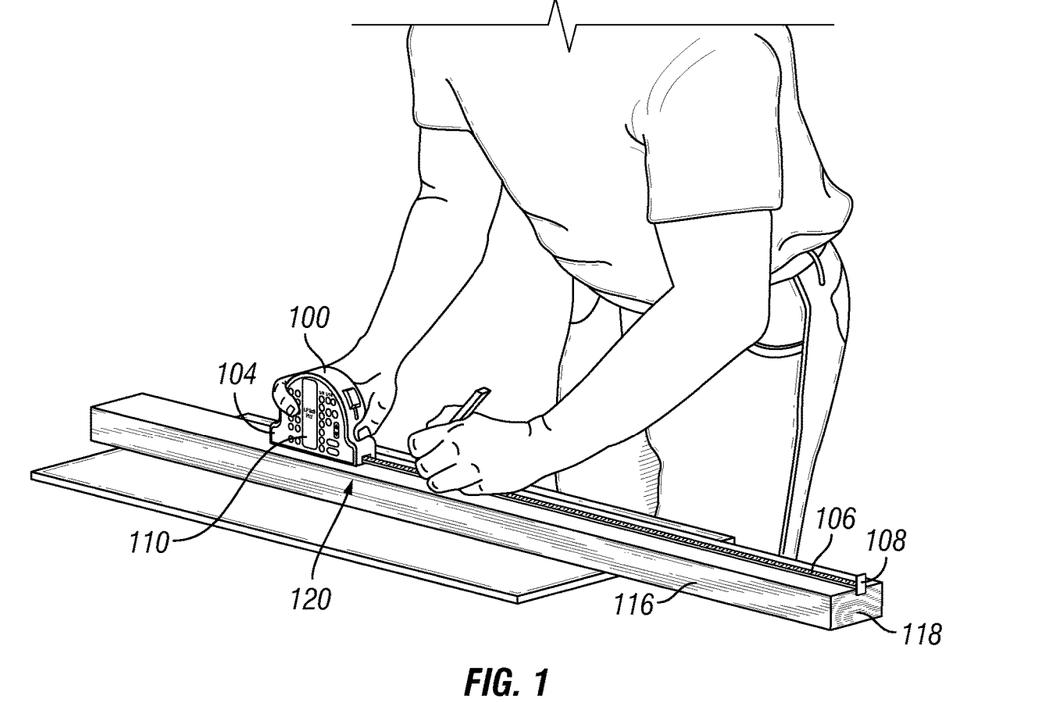
FIG. 1 illustrates a perspective view of a measurer measuring a workpiece with an exemplary digital workpiece measurement system, in accordance with an embodiment of the present invention.

As FIG. 1 illustrates, the system 100 provides a flexible measuring tape 106 that measures the distance between a starting measuring point 118 and an end measuring point 120 along a section of the workpiece 116. The starting or end measuring point 118, 120 from a short point, long point, square cut angle, and material characteristics of the workpiece 116 are inputted through a plurality of alphanumeric character switch mechanisms 114a-n, and an enter switch mechanism 202.

Further, the system 100 provides multiple measurement-related functions, including short, long, square check, and incremental number switch mechanisms. These switch mechanisms work in conjunction to enable a measurer to manually input the measurements, incrementally edit the measurements, identify the short point, long point, and square edges of the workpiece 116, and transmit the measurements and other data to a remote data storage unit 708 for future processing and measurement analysis. The system 100 also provides a clip 900 and/or an adhesive 800 for detachably attaching to a belt, wall, or other mounting surface, so as to facilitate carrying and measuring.

Figure 2:
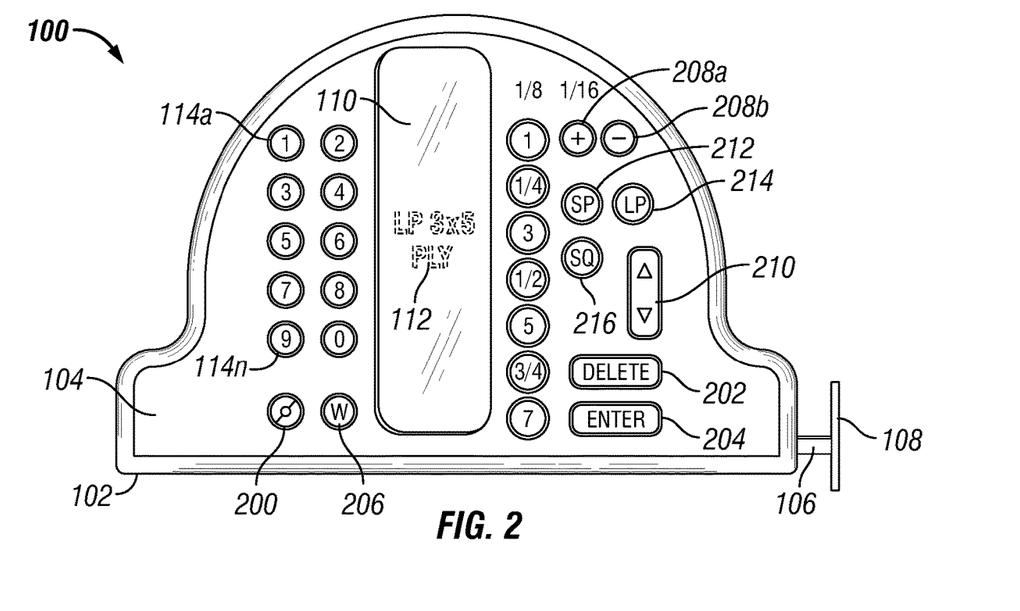
FIG. 2 illustrates a frontal view of the digital workpiece measurement system, in accordance with an embodiment of the present invention.

As referenced in FIG. 2, the system 100 comprises a housing 102 that is defined by multiple sidewalls 104 and an opening 308. The housing 102 is configured to prevent moisture and debris from entering inside, where electrical, such as a processor 302; and mechanical components, such as a flexible measuring tape 106 and a spool 310. As FIG. 3B shows, the opening 308 is shaped as an elongated slot. Suitable materials for the housing 102 may include, without limitation, polyurethane, polyvinyl chloride, a rigid polymer, aluminum, and a metal alloy.

The system 100 further comprises a flexible measuring tape 106. The measuring tape 106 is defined by multiple linear measurement marks that serve as identifiers to measure a distance, from a starting measurement point to an end measurement point of the workpiece 116. The measuring tape 106 is extendable and retractable from the opening in the housing 102 to measure distance as a function of length of the measuring tape 106 extended from the housing 102.

In some embodiments, a flange 108 joins to the terminus of the measuring tape 106. The flange 108 indicates the starting measuring point 118. For example, extending the flange 108 (terminus of the measuring tape 106) 6" involves stretching from 0" to 6". In one embodiment, the measuring tape 106 is a stiff metallic material that can stiffen when needed but can also roll up for simple use and storage. From other embodiments however, the measuring tape 106 may be fabricated from plastic, cloth, rubber, and other resilient polymers.

Further, FIG. 3B shows the measuring tape 106 being carried on a spool 310 that is disposed in the housing 102. The spool 310 is configured to wind the measuring tape 106 when it is retracted inside the housing 102. In this manner, the measuring tape 106 is extendable and retractable from the opening in the housing 102. The measuring tape 106 works by measuring the extended distance as a function of length of the measuring tape 106 extended from the housing 102. For example, if the measuring tape 106 is extended 3", then "3" can be inputted into the digital display screen 110.

Continuing with the measurement components of the system 100, a micrometer head 306. The micrometer head 306 measures micrometer dimensions electronically and communicating the measurements to the processor 302 for storage and display on the display screen 110. The micrometer head 306 operatively attaches to the flange 108 at the terminus of the tape or is operatively attached to the spool. The micrometer head 306 is configured to measure—through rotation—a micrometer dimension, such as length. The micrometer head 306 communicating the measurement to the display screen 110 for display. Though in other embodiments, the micrometer head 306 communicates electronically with the processor 302.

In some embodiments, the spool 310 may be spring-biased to enable automatic retraction of the measuring tape 1-6 inside the housing 102. Thus, as the measuring tape is pulled out, it locks to a fixed position, and then can be manipulated to release back into the housing 102. A flange 108 joins to the terminus of the measuring tape 106. The flange 108 may extend perpendicularly at a distance from the terminus of the measuring tape 106, so as to provide a hanging or hooking capacity to the terminus of the tape. The flange 108 indicates the starting measuring point 118 and the end measuring point 120 during measurements.

Figure 3A:
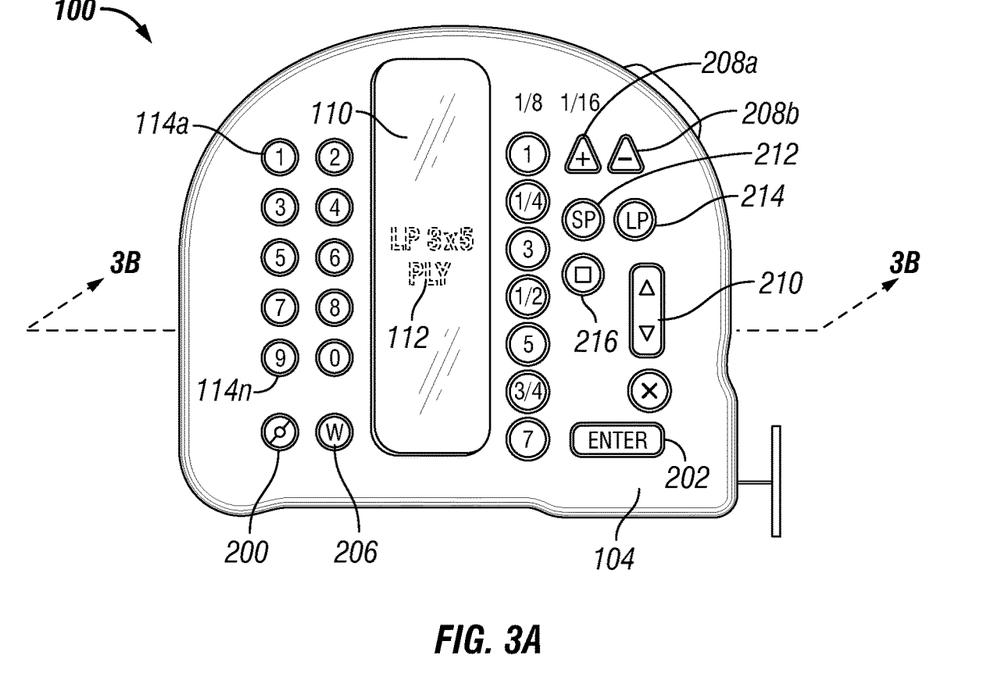
FIG. 3A illustrates a frontal view the housing of the digital workpiece measurement system, in accordance with an embodiment of the present invention.
Figure 3B:
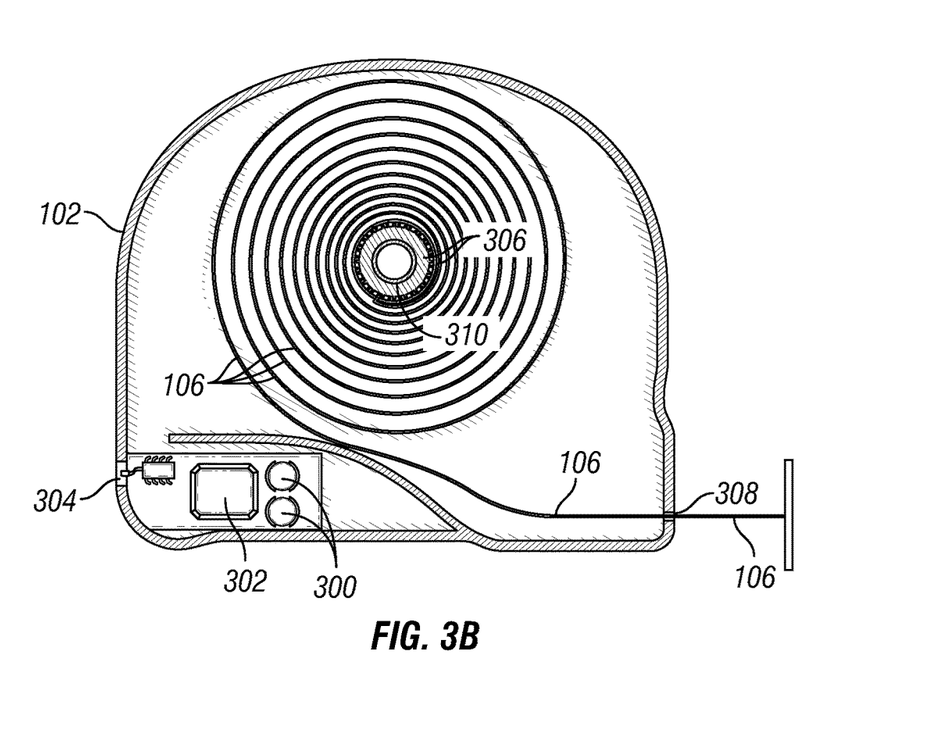
FIG. 3B illustrates a sectioned side view of the housing, the section taken along section 3B-3B of FIG. 3A, detailing the inside of the housing, in accordance with an embodiment of the present invention.

As FIG. 3A shows, the system 100 is unique in that various switch mechanisms are directly operable on the housing 102 to input measurements and identify angles and materials characteristics of the workpiece 116. In one possible embodiment, the system 100 provides a plurality of alphanumeric character switch mechanisms 114a, 114n that are operable to enable a measurer to input at least one alphanumeric character for display on the display screen 110. The alphanumeric character may include the digits 0-9. Though in other embodiments, various letters and symbols helpful for indicating measurement lengths and angles of a workpiece 116 may also be used, i.e., inches, degrees, etc.

Figure 4:
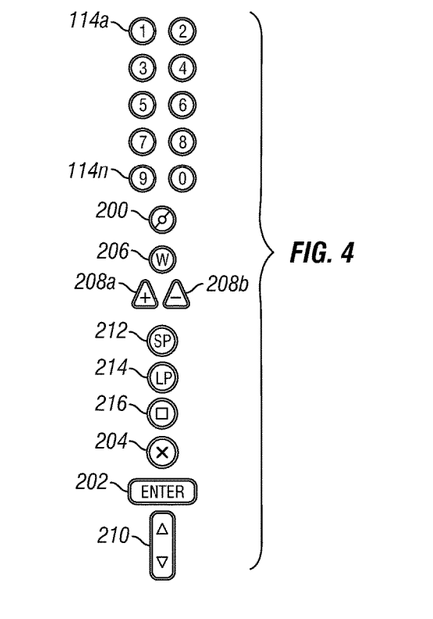
FIG. 4 illustrates a frontal view of various functional incremental switches for the digital workpiece measurement system, in accordance with an embodiment of the present invention.

As shown in FIG. 4, the system 100 provides at least one incremental switch mechanism 208a, 208b that is operable to incrementally increase and decrease the measurement, and inputted into the display screen 110. A positive incremental switch 208a increases the alphanumeric character; while a negative incremental switch 208b decreases the alphanumeric character. In one possible embodiment, the incremental switch mechanism includes an "increase button" and a "decrease button" that incrementally change the value of the inputted measurement. In another embodiment, the incremental number is ⅛" or other units. In another embodiment, the incremental number is ¹⁄₁₆" or other units. Though other embodiments of the incremental numbers may include ¼", ½", ¾", etc.

The inputted alphanumeric character can be increased or decreased by this preset amount by depressing the respective incremental switch mechanism. In this manner, the processor 302 can record measurements longer than the total length of the measuring tape electronically by adding multiples of the total length of the measuring tape 106 to the actual tape reading 112 to obtain the final length dimension.

To process the measurements, the system 100 includes a processor 302 (FIG. 3B). The processor 302 is in communication with the micrometer head 306. The processor 302 is configured to process the measurement recorded by the measuring tape and the input alphanumeric character. The processor 302 also stores the measurement recorded by the measuring tape and the input alphanumeric character. In some embodiments, the processor 302 may include a microchip, a microprocessor 302, or other processing device known in the art.

One of the more unique features of the system 100 is a display screen 110 that is disposed on the sidewall of the housing 102. The display screen 110 is operable to digitally display a readout 112 of the distance from the starting measuring point 118 to the end measuring point 120. The display screen 110 is also operable to digitally display a readout 112 of the incrementally increased or decreased measurement and the inputted alphanumeric character. The display screen 110 is operable to display a digital readout 112 of length of the measuring tape extended from the housing 102 as an indication of distance measured.

While the display screen 110 is independent of the measuring tape 106, the recorded distance on the measuring tape 106 is inputted for viewing, storage, and remote transmission into the display screen 110. Furthermore, the display screen 110 can also be used to display a material composition of the workpiece 116. In one embodiment, the display screen 110 comprises a black tinted LCD screen. In other embodiments, the display screen 110 may include, without limitation, a cathode ray tube display (CRT), a light-emitting diode display (LED), an electroluminescent display (ELD), an electronic paper, E Ink, a plasma display panel (PDP), a liquid crystal display (LCD), and an organic light-emitting diode display (OLED).

The system 100 provides multiple intelligent functionality switching mechanisms that help identify the starting measuring point 118 and ending measuring point on the workpiece 116. In some embodiments, the system 100 provides electrical switches that allow the digital readout 112 on the display screen 110 to convert the readout 112 from either English or the metric units. In other embodiments, the circuitry can be provided with a memory switch whereby measurements can be added or subtracted or reset as desired during a measuring function.

The display screen 110 is operable through a scroll switch mechanism 210 that is manipulated to scroll the displayed readout 112 across the display screen 110. Looking again at FIG. 2, the scroll switch mechanism 210 can be manipulated to scroll the measurement and the inputted alphanumeric character, across the display screen 110.

Further, the system 100 also includes an enter switch mechanism 202 that stores the input alphanumeric character into the processor 302. The enter switch mechanism 202 is depressed to save and store the measurement. In another embodiment, the enter switch mechanism 202 is also functional to duplicate a measurement on the display screen 110 by scrolling shown to as desired measurement and holding the enter switch mechanism 202 down for at least 4 seconds. The measurement number will then appear in duplicate on the display screen 110. In some embodiments, the system 100 comprises a delete switch mechanism 204 that is operable to delete the input alphanumeric character into the processor 302. The delete switch mechanism 204 is pressed twice and held to delete the inputted and displayed measurements displayed on the display screen 110.

Figure 5:
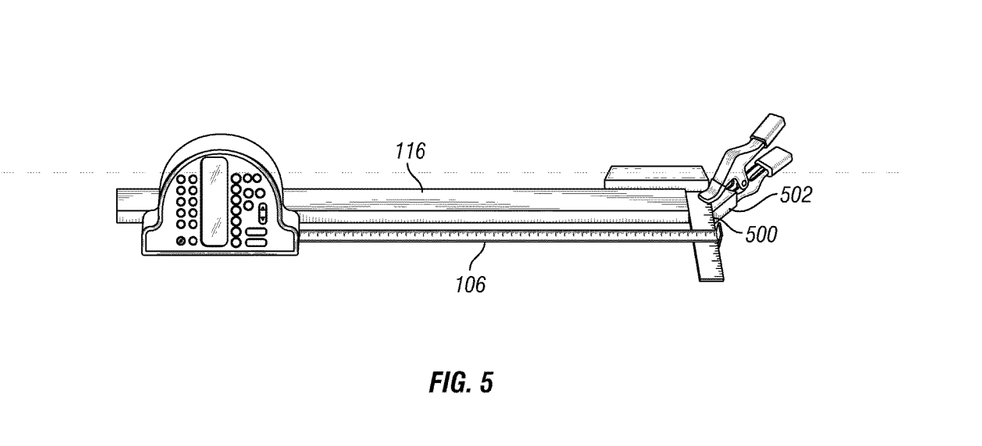
FIG. 5 illustrates a perspective view of an exemplary short point obtuse angle and a long point acute angle for an exemplary workpiece, in accordance with an embodiment of the present invention.

One of the unique functions of the system 100 is the capacity to identify whether the starting measuring point 118 and the end measuring point 120 are mitered trims, angles, and square cuts. As FIG. 5 illustrates, the short point is the obtuse angle 500 on the inside edge of the workpiece 116. A short point switch mechanism 212 is operable to record the starting measurement point or the end measurement point from an obtuse angle 500. For this function, the short point switch mechanism 212 is depressed to record the starting measurement point and/or the end measurement point of the flange 108 on an obtuse angle 500 of the workpiece 116.

Further, the acute angle 502 at the very tip of the workpiece 116 is called the long point. The system 100 provides a long point switch mechanism 214 that is operable to record the starting measurement point or the end measurement point from an acute angle 502 on the workpiece 116. The long point switch mechanism 214 can be depressed to record the starting measurement point and/or the end measurement point of the flange 108 on an acute angle 502 of the workpiece 116. FIG. 5 illustrates the difference in angles 500, 502 for a short point cut and a long point cut. As shown, the obtuse angle 500 of the short point creates difficulties for holding the measuring tape. Thus, recording the starting measuring point 118 as either a short point or a long point can be helpful for the measurer. This can minimize confusion on where to start or end the measurement along the workpiece 116.

Figure 6:
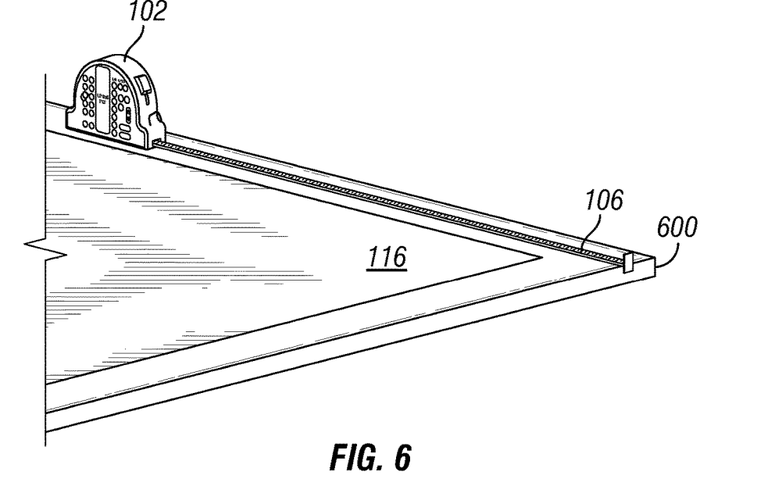
FIG. 6 illustrates a perspective view of an exemplary square edge for a workpiece, in accordance with an embodiment of the present invention.

As illustrated in FIG. 6, the edges of the workpiece 116 that meet at a perpendicular 90° is the square 600. The system 100 provides a square check switch mechanism 216 that is operable to record the starting measurement point or the end measurement point from a square edge on the workpiece 116. The square check switch mechanism 216 can be depressed to record the starting measurement point or the end measurement point of the flange 108 at the two edges that form the square 600 of the workpiece 116. The square check switch mechanism 216 allows the measurer to identify the material starts with a square cut. This allows the measurer to mark both length and width and then identify on measuring tape.

In operation, a workpiece 116 is determined for measuring. The flange 108 at the terminus of the measuring tape is placed against a starting measuring point 118, and then pulled the desired distance for measuring the length of the workpiece 116 to an end measuring point 120. After extending the measuring tape 106 across the desired length of the workpiece 116, a measurement by the linear measurement marks on the measuring tape 106 is determined. The measurer then presses the enter switch mechanism and hold for about 2-3 seconds. The measurer can then enter desired measurement in the alphanumeric character switch mechanism 114a-n. Finally, the measurer presses the enter switch mechanism 202 again to store the measurement.

In one exemplary measurement with the system 100, the measuring tape is extended from the starting measuring point 118 to the end measuring point 120 to a length of 12½". In this example, the starting measuring point 118 is at long point (acute angle) on the workpiece 116, and the end measuring point 120 is at a square cut where two edges form a perpendicular on the workpiece 116. Through the alphanumeric switch mechanisms 114a-n and other function switch mechanisms, the measurer enters the following sequence:

Depress the enter switch mechanism and hold for about 2 to 3 seconds
Depress the long point switch mechanism
Input into the alphanumeric switch mechanisms "1"
Input into the alphanumeric switch mechanisms "2"
Input into the alphanumeric switch mechanisms "½"
Depress the Square check switch mechanism,
Depress the Enter switch mechanism to store the 12½" measurement.

At this point, the display screen 110 displays: "LP 12½ SQ". Thus, reading from left to right, the displayed measurement indicates to the measurer or a remote measurer that the measurement requires starting at the long point, extending for a length of 12½", and ending the measurement at the square cut on the workpiece 116. This measurement information can be edited, stored, and transmitted for further use.

Another example of the functionality of the system 100 involves use of the square check switch mechanism 216. In this example, the starting measuring point 118 is at long point (acute angle) on the workpiece 116, and the end measuring point 120 is at a square cut where two edges form a perpendicular on the workpiece 116. Through the alphanumeric switch mechanisms 114*a-n* and other function switch mechanisms, the measurer enters the following sequence:

The square check switch mechanism 216 is held, 2 seconds, before entering the alphanumeric character. The display screen 110 indicates "PLY". This will refer to the workpiece 116 being a plywood sheeting material. When entering desired measurement, the square check switch mechanism 216 is depressed between length and width. At this point, the square check switch mechanism displays "X".

Through the alphanumeric switch mechanisms 114*a-n* and the square check switch mechanism 216, the measurer enters the following sequence to determine and identify a square 600 edge for starting or ending the measurement for a 3'×5' section of plywood:
Input into the alphanumeric character switch mechanisms Plywood 3 ft. by 5 ft.
Depress the square check switch mechanism
Input into the alphanumeric character switch mechanisms "3"
Input into the alphanumeric character switch mechanisms "sq."
Input into the alphanumeric character switch mechanisms "5"

At this point, the display screen 110 displays: "PLY 3×5". Thus, reading from left to right, the displayed measurement indicates to the measurer or a remote measurer that the measurement requires starting at the square cut, extending for a length of 3×5, and ending the measurement at the square cut on the workpiece 116. This measurement information can be edited, stored, and transmitted for further use.

As discussed above, the stored measurement data can be transmitted to a remote data storage unit 708 through use of a Wi-Fi switch mechanism 206. As FIG. 7 references, the Wi-Fi switch mechanism is operable to initiate the transmission of the readout 112 on the digital display, the stored measurement recorded by the micrometer head 306, and the stored alphanumeric character to a remote data storage unit 708. The system 100 is unique in that the measurements and the inputted numbers can be transmitted to a remote data storage unit or laptop.

For this purpose, the system 100 includes a wireless transmission device 706 that is operable to transmit the measurement recorded by the measuring tape and the input alphanumeric character, through a Wi-Fi signal, to at least one remote data storage unit 708. The remote data storage unit 708 may include, without limitation, a database, a server, a cloud, and a call center.

Thus, the Wi-Fi switch mechanism 206 allows the measurer to initiate the transmission of the displayed measurement to a second intelligent measuring system and/or a laptop 504, for example, through the wireless transmission device. The capacity to transmit the measurement data allows multiple measurers to analyze and compare measurements of the workpiece 116 for optimal cutting. In one embodiment, two measurers about 12' apart can communicate measurements through the wireless transmission device 706. The wireless transmission device 706 may include, without limitation, Wi-Fi, radio transmission components, a transmitter, an antenna, a modem, and a router.

Figure 7:
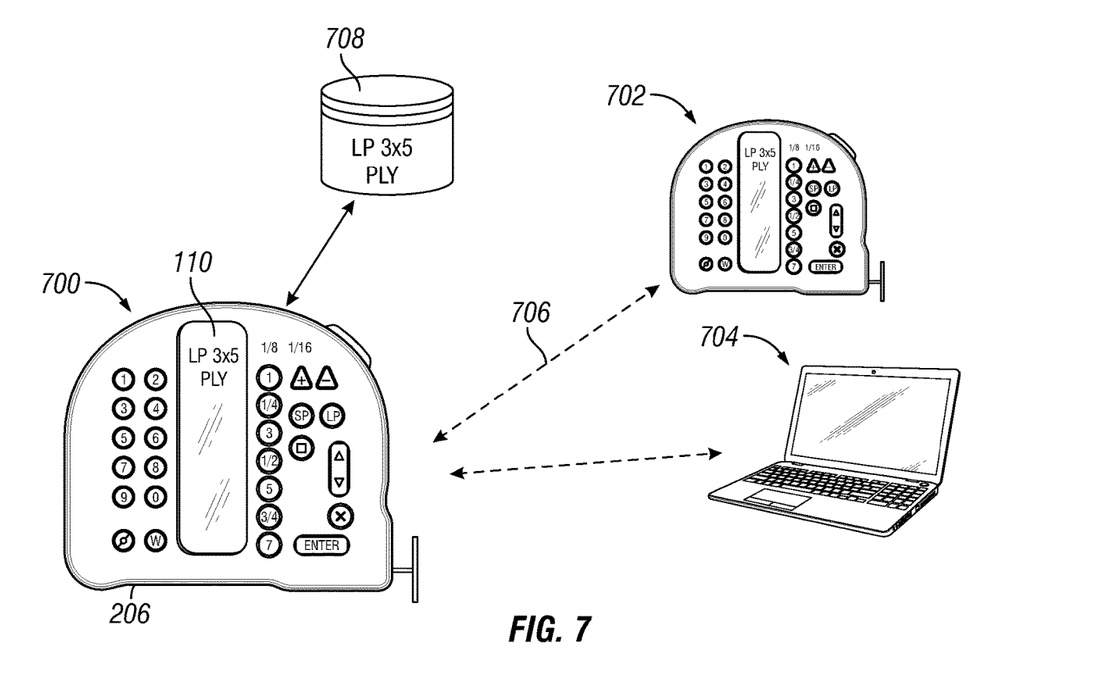
FIG. 7 illustrates a perspective view of the digital workpiece measurement system transmitting measurements to a second measuring tape system and a laptop through a wireless transmission device, in accordance with an embodiment of the present invention.

For example, FIG. 7 illustrates a tape measure system #1 700 that has measured a distance and a displayed a 3½" length measurement for the workpiece 116. Once this measurement is entered and stored in the processor 302, the measurement data is transmitted to tape measure system #2 702 and/or a laptop 704. The wireless transmission device includes a Wi-Fi switch mechanism that initiates the transmission of the data. The laptop allows the measurers to keep track of linear footing and overall use of the materials of the workpiece 116.

For example, once the tape measure system #1 700 and tape measure system #2 702 are operatively connected, the Wi-Fi switch mechanism is depressed to access the shared measurements and other related data. Note, if the Wi-Fi switch mechanism 206 is not depressed, the measurement is only saved to tape measure system #1 700. However, by depressing the Wi-Fi switch mechanism 206 before entering (inputting) the measurement, it is saved and transmitted to both measure systems #1 and #2 700, 702.

In some embodiments, the system 100 provides a power source 300 that is configured to power the system 100. The power source 300 helps power the processor 302, the digital display, and other electrical components. The power source 300 may include a battery or an external power plug. In operational communication with the power source 300 is a power switch mechanism that works to power on and power off the system. In one non-limiting embodiment, a USB port 304 in the housing 102 receives an external power source.

Figure 8:
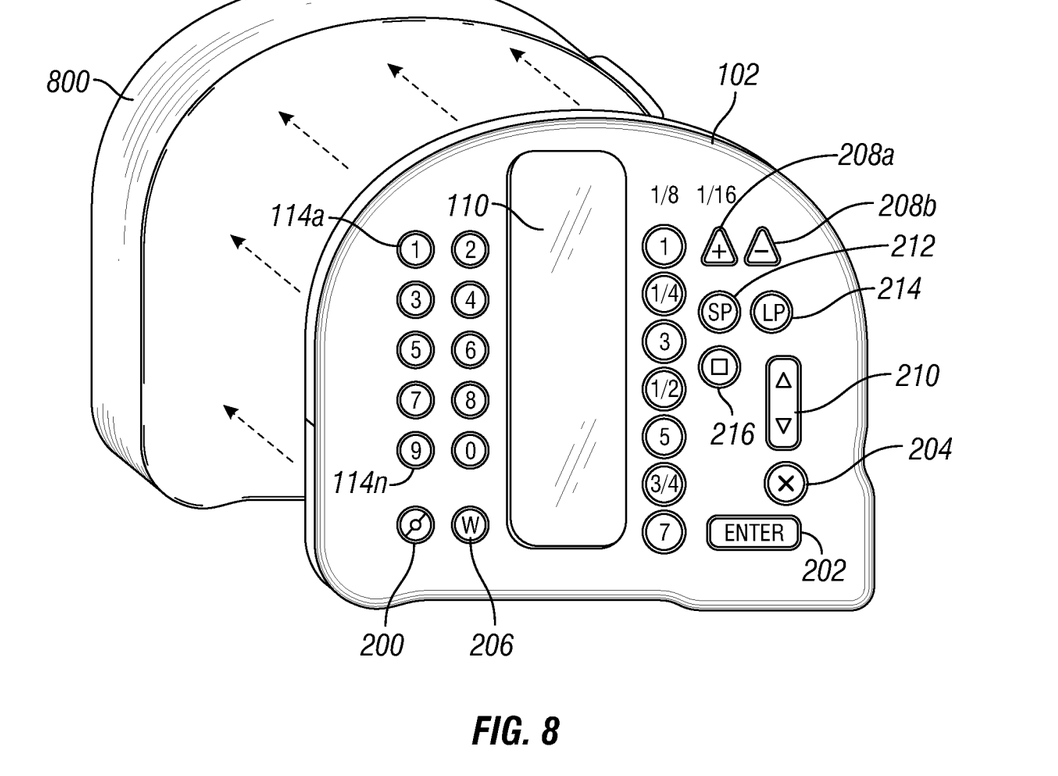
FIG. 8 illustrates a perspective view of an exemplary housing adhering to a wall through an adhesive strip, in accordance with an embodiment of the present invention.
Figure 9:
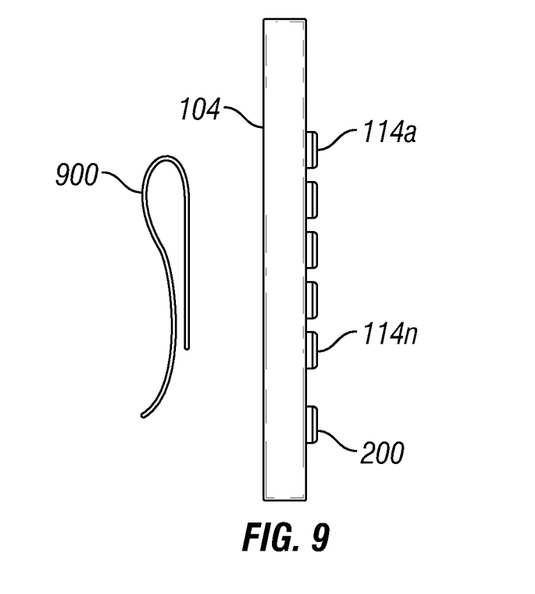
FIG. 9 illustrates a perspective view of an exemplary clip clamping a housing clipped to a belt, in accordance with an embodiment of the present invention.

Looking again at the housing 102, a clip 900 may be used at the sidewall to enable clamping to a belt of the measurer (FIG. 9). The clip 900 is effective for facilitating carrying of the housing 102, and for holding the terminus of the flexible tape during measuring. In addition to the clip, the system provides an adhesive 800 that is disposed on the sidewall 104 of the housing 102 (FIG. 8). The adhesive 800 allows the housing 102 to be securely mounted at a desired position on a wall or other mounting surface while measuring. In yet other embodiments, other mounting systems known in the art may also be used for carrying and measuring.

Figure 10:
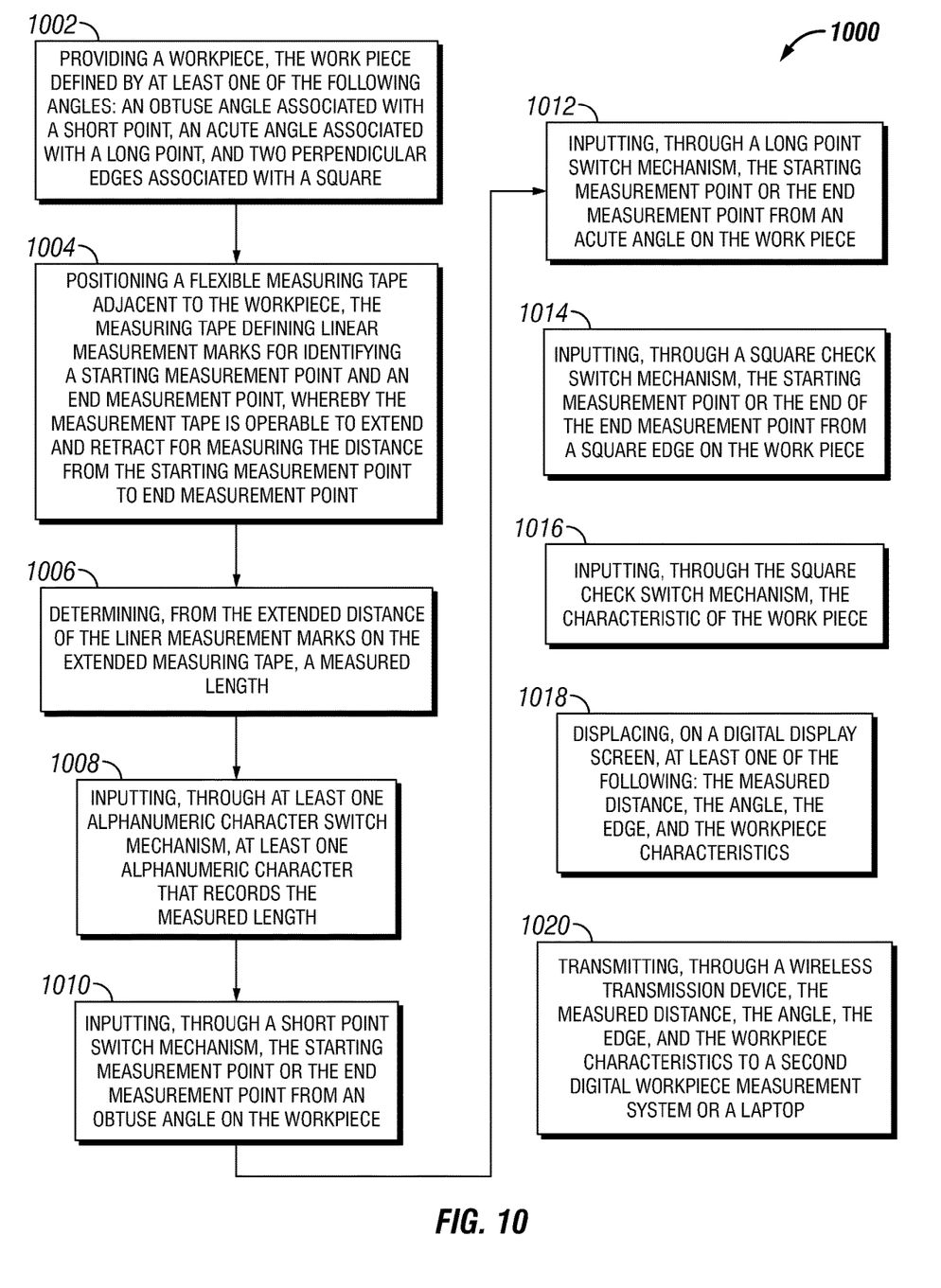
FIG. 10 illustrates a flowchart of an exemplary method for measuring the length of a workpiece with a digital workpiece measurement system, in accordance with an embodiment of the present invention.

FIG. 10 illustrates a flowchart of an exemplary method 1000 for measuring the length of a workpiece with a digital workpiece measurement system. The method 1000 may include an initial Step 1002 of providing a workpiece, the workpiece defined by at least one of the following angles: an obtuse angle 500 associated with a short point, an acute angle 502 is associated with a long point, and two perpendicular edges associated with a square 600 edge. The measuring tape is extendable and retractable from the opening in the housing to measure distance as a function of length of the measuring tape extended from the housing 102.

The method 1000 may further comprise a Step 1004 of positioning a flexible measuring tape adjacent to the workpiece, the measuring tape defining linear measurement marks for identifying a starting measurement point and an end measurement point of the workpiece, whereby the measurement tape is operable to extend and retract for measuring the distance from the starting measurement point to the end measurement point. A Step 1006 includes determining, from the extended distance of the linear measurement marks on the extended measuring tape, a measured length.

In some embodiments, a Step 1008 comprises inputting, through at least one alphanumeric character switch mechanism, at least one alphanumeric character that records the measured length. A Step 1010 includes inputting, through a short point switch mechanism, the starting measurement point or the end measurement point from an obtuse angle on the workpiece. In some embodiments, a Step 1012 may include inputting, through a long point switch mechanism, the starting measurement point or the end measurement point from an acute angle on the workpiece.

A Step 1014 comprises inputting, through a square check switch mechanism, the starting measurement point or the end measurement point from a square edge on the workpiece. The method 1000 may further comprise a Step 1016 of inputting, through the square check switch mechanism, the characteristic of the workpiece. A Step 1018 includes displaying, on a digital display screen, at least one of the following: the measured distance, the angle, the edge, and the workpiece characteristics.

A final Step 1020 includes transmitting, through a wireless transmission device, the measured distance, the angle, the edge, and the workpiece characteristics to a second digital workpiece measurement system or a laptop. Wi-Fi switch mechanism 206 allows the measurer to initiate the transmission of the displayed measurement to a second intelligent measuring system and/or a laptop 504, for example, through the wireless transmission device.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A digital workpiece measurement system, the system comprising:
   a housing defined by multiple sidewalls and an opening;
   a flexible measuring tape defined by multiple linear measurement marks operable to measure a distance from a starting measurement point to an end measurement point, the measuring tape being extendable and retractable from the opening in the housing to measure distance as a function of length of the measuring tape extended from the housing;
   a spool disposed in the housing, the spool operable to wind the measuring tape for extension from and retraction towards the housing;
   a plurality of alphanumeric character switch mechanisms operable to enable input of at least one alphanumeric character;
   at least one incremental switch mechanism operable to incrementally increase and decrease the measurement recorded by the measuring tape, the incremental switch mechanism further being operable to incrementally increase and decrease and the inputted alphanumeric character;
   a processor in communication with a micrometer head, the processor operable to store the measurement recorded by the micrometer head, the processor further being operable to store the inputted alphanumeric character;
   a display screen disposed on the sidewall of the housing, the display screen operable to digitally display a readout of the distance from the starting measurement point to the end measurement point, the display screen further being operable to digitally display a readout of the incrementally increased or decreased measurement and the inputted alphanumeric character;
   an enter switch mechanism operable to initiate storage of the displayed readout into the processor;
   a delete switch mechanism operable to delete the displayed readout on the display screen; and
   a Wi-Fi switch mechanism operable to initiate the transmission of the readout on the digital display, the stored measurement recorded by the micrometer head, and the stored alphanumeric character to a remote data storage unit.

2. The system of claim 1, wherein the measuring tape is extendable and retractable from the opening in the housing to measure distance as a function of length of the measuring tape extended from the housing.

3. The system of claim 1, wherein the linear measurement marks are operable to measure the distance from the starting measurement point to the end measurement point of a workpiece.

4. The system of claim 3, further comprising a short point switch mechanism operable to record the starting measurement point or the end measurement point from an obtuse angle on the workpiece.

5. The system of claim 4, further comprising a long point switch mechanism operable to record the starting measurement point or the end measurement point from an acute angle on the workpiece.

6. The system of claim 5, further comprising a square check switch mechanism operable to record the starting measurement point or the end measurement point from a square edge on the workpiece.

7. The system of claim 1, further comprising a flange joined to the terminus of the measuring tape, the flange indicating the starting measuring point.

8. The system of claim 1, wherein the micrometer dimension comprises a length.

9. The system of claim 1, further comprising a power source operable to power the system.

10. The system of claim 9, further comprising a power switch mechanism operatively connected to the power source, the power switch mechanism powering on and off the system.

11. The system of claim 1, wherein the input of the at least one alphanumeric character digitally displays on the display screen.

12. The system of claim 1, wherein the at least one alphanumeric character comprises at least one number between 0 and 9.

13. The system of claim 1, wherein the Wi-Fi switch mechanism is operable to initiate the transmission of the readout on the digital display, the stored measurement recorded by the micrometer head, and the stored alphanumeric character to the remote data storage unit, through a wireless transmission device.

14. The system of claim 1, further comprising a scroll switch mechanism operable to scroll the displayed readout across the display screen.

15. The system of claim 1, further comprising a clip joined to the sidewall of the housing.

16. The system of claim 1, further comprising a micrometer head operatively attached to the spool, the micrometer head measuring a length electronically, the micrometer head communicating the length measurement to the display screen.

17. The system of claim 1, further comprising an adhesive disposed on the sidewall of the housing.

18. A digital workpiece measurement system, the system comprising:
- a housing defined by multiple sidewalls and an opening;
- a clip joined to the sidewall of the housing;
- an adhesive disposed on the sidewall of the housing;
- a flexible measuring tape defined by multiple linear measurement marks operable to measure a distance from a starting measurement point to an end measurement point of a workpiece, the measuring tape being extendable and retractable from the opening in the housing to measure distance as a function of length of the measuring tape extended from the housing;
- a flange joined to the terminus of the measuring tape, the flange indicating the starting measuring point;
- a spool disposed in the housing, the spool operable to wind the measuring tape for extension from and retraction towards the housing;
- a micrometer head operatively attached to the spool, the micrometer head measuring a length electronically, the micrometer head communicating the length measurement to the display screen;
- a plurality of alphanumeric character switch mechanisms operable to enable input of at least one alphanumeric character;
- at least one incremental switch mechanism operable to incrementally increase and decrease the measurement recorded by the measuring tape, the incremental switch mechanism further being operable to incrementally increase and decrease and the inputted alphanumeric character;
- a processor in communication with the micrometer head, the processor operable to store the measurement recorded by the micrometer head, the processor further being operable to store the inputted alphanumeric character;
- a display screen disposed on the sidewall of the housing, the display screen operable to digitally display a readout of the distance from the starting measurement point to the end measurement point, the display screen further being operable to digitally display a readout of the incrementally increased or decreased measurement and the inputted alphanumeric character;
- a scroll switch mechanism operable to scroll the displayed readout across the display screen;
- an enter switch mechanism operable to initiate storage of the displayed readout into the processor;
- a delete switch mechanism operable to delete the displayed readout on the display screen;
- a short point switch mechanism operable to record the starting measurement point or the end measurement point from an obtuse angle on the workpiece;
- a long point switch mechanism operable to record the starting measurement point or the end measurement point from an acute angle on the workpiece;
- a square check switch mechanism operable to record the starting measurement point or the end measurement point from a square edge on the workpiece;
- a Wi-Fi switch mechanism operable to initiate the transmission of the readout on the digital display, the stored measurement recorded by the micrometer head, and the stored alphanumeric character to a remote data storage unit;
- a power source operable to power the system; and
- a power switch mechanism operatively connected to the power source, the power switch mechanism powering on and off the system.

19. The system of claim 18, wherein the measuring tape is extendable and retractable from the opening in the housing to measure distance as a function of length of the measuring tape extended from the housing.

20. A method for intelligent measurements with a digital workpiece measurement system, the method comprising:
- providing a workpiece, the workpiece defined by at least one of the following angles: an obtuse angle associated with a short point, an acute angle associated with a long point, and two perpendicular edges associated with a square;
- positioning a flexible measuring tape adjacent to the workpiece, the measuring tape defining linear measurement marks for identifying a starting measurement point and an end measurement point of the workpiece, whereby the measurement tape is operable to extend and retract for measuring the distance from the starting measurement point to the end measurement point;
- determining, from the extended distance of the linear measurement marks on the extended measuring tape, a measured length;
- inputting, through at least one alphanumeric character switch mechanism, at least one alphanumeric character that records the measured length;
- inputting, through a short point switch mechanism, the starting measurement point or the end measurement point from an obtuse angle on the workpiece;
- inputting, through a long point switch mechanism, the starting measurement point or the end measurement point from an acute angle on the workpiece;
- inputting, through a square check switch mechanism, the starting measurement point or the end measurement point from a square edge on the workpiece;
- inputting, through the square check switch mechanism, the characteristic of the workpiece;
- displaying, on a digital display screen, at least one of the following: the measured distance, the angle, the edge, and the workpiece characteristics; and
- transmitting, through a wireless transmission device, the measured distance, the angle, the edge, and the workpiece characteristics to a second digital workpiece measurement system or a laptop.

* * * * *